United States Patent
Trump et al.

(10) Patent No.: US 8,130,940 B2
(45) Date of Patent: Mar. 6, 2012

(54) ECHO DETECTION

(75) Inventors: Tõnu Trump, Enskede gård (SE); Anders Eriksson, Uppsala (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 644 days.

(21) Appl. No.: 12/095,856

(22) PCT Filed: Nov. 28, 2006

(86) PCT No.: PCT/SE2006/001358
§ 371 (c)(1),
(2), (4) Date: Jun. 2, 2008

(87) PCT Pub. No.: WO2007/067125
PCT Pub. Date: Jun. 14, 2007

(65) Prior Publication Data
US 2008/0292109 A1    Nov. 27, 2008

(51) Int. Cl.
*H04M 9/08*    (2006.01)

(52) U.S. Cl. ................................................. 379/406.06

(58) Field of Classification Search ............... 379/406.06
See application file for complete search history.

(56) References Cited

U.S. PATENT DOCUMENTS

| | | | |
|---|---|---|---|
| 4,224,620 A * | 9/1980 | Seiersen | 342/90 |
| 5,812,970 A * | 9/1998 | Chan et al. | 704/226 |
| 6,643,337 B1 * | 11/2003 | Pierce | 375/343 |
| 6,804,203 B1 | 10/2004 | Benyassine et al. | |
| 6,912,277 B1 * | 6/2005 | Mashinsky et al. | 379/114.12 |
| 7,496,482 B2 * | 2/2009 | Araki et al. | 702/190 |
| 2008/0069016 A1 * | 3/2008 | Cao et al. | 370/289 |
| 2009/0080644 A1 * | 3/2009 | Malfait et al. | 379/406.06 |

FOREIGN PATENT DOCUMENTS
WO    WO 2004021679 A2    3/2004

* cited by examiner

*Primary Examiner* — Alexander Jamal

(57) ABSTRACT

An echo detector includes means (34) for forming a set of distance measures between pitch estimates of a first signal and pitch estimates of a second signal at predetermined delays with respect to the first signal. A selector (36) selects a distance measure from the set corresponding to the highest similarity between the first and second signals. A classifier (32) classifies the second signal as including an echo if the selected distance measure has a predetermined relation to a similarity threshold (TH).

26 Claims, 5 Drawing Sheets

ECHO DETECTION

TECHNICAL FIELD

The present invention relates generally to detection of signal similarity, and in particular to echo detection in telecommunication systems.

BACKGROUND

In some applications it is necessary to detect presence of a possibly modified version of a known speech signal in a received signal that may consist of several speech and noise components and to estimate the relative delay of the component of interest. Examples of such applications are echo control, network statistics collection and multi-party conference bridges.

The underlying problem is illustrated in FIG. 1. A known speech signal is delayed in a delay block 10 and is affected by an unknown transformation 12 on its way to a summation point 14. It may or may not reach the summation point (switch 16 may be open or closed). In the summation point the signal is mixed with other speech signals and noise. On its way back to the point from which the original signal was transmitted, the signal from summation point 14 is again altered by an unknown transformation 18 and a delay block 20. The problem is to detect whether a possibly modified version of the original known speech signal is present in the received signal, and if yes, to estimate its relative delay with respect to the known speech signal. This is performed by a detection and delay estimation block 22.

A phenomenon of hearing delayed reflections of ones own voice is referred to as echo. In a telephone network, the main source of the echo is electrical reflection in the so-called hybrid circuit connecting the 4-wire part of the network with a two-wire subscriber line. This electrical echo is commonly handled by network echo cancellers installed in the telephone system. The network echo canceller should normally be installed close to the echo source. For example, network echo cancellers are required in the media gateways interfacing packet networks (IP or ATM) to PSTN networks or Mobile Services Switching Centres interfacing mobile networks to PSTN networks. Similarly network echo cancellers should be installed in international exchanges, and in some situations in telephone exchanges inside one country if the end-to-end transmission delay exceeds 25 ms, see [1]. In some cases the network echo canceller may, however, be missing in its proper location i.e. in a telephone exchange close to the echo source. If this is the case, long distance calls to and from such a location suffer from echo problems. An international operator in another country may want to solve the problem for its own customers by detecting the calls with echo generated in the distant location and take proper measures for removing the echo. To do so, it is necessary to detect the echo and estimate its delay.

Another echo source is acoustical coupling between loudspeaker and microphone of a telephone (terminal). This type of echo may be returned from e.g. mobile terminals or IP phones. Ideally the terminals should handle their own echoes in such a way that no echo is transmitted back to the system. Even though many of the terminals currently in use are able to handle their own echoes properly, there are still models that do not.

The acoustical echo problem is not easy to solve in the network, see [2], since the echo path includes speech encoders and decoders. Furthermore, in the case of mobile networks, the signals are transmitted over a radio channel that introduces bit-errors in the signal. This makes the echo path nonlinear and non-stationary and introduces an unknown delay in the echo path, so that ordinary network echo cancellers are generally not able to cope with acoustical echoes returned from mobile terminals. Again, in order to cope with the echoes one first needs to detect whether the echo is present in the call, and if yes, to estimate its delay.

Another application where this type of detection is useful, is network statistics collection. A telecom operator may wish to collect various statistical data related to the quality of phone calls in its network. Some of the statistics of interest are the presence of echoes returned from terminals (e.g. mobile phones or IP phones) and the delay associated with these echoes. To accomplish this task the statistics collection unit could include a detection and delay estimation block 22 as illustrated in FIG. 1. In this example the detection and estimation results would be stored in a database for later use as opposed to the immediate use of the results for echo control in the previous examples. The statistics stored in the database can be used to present aggregated network statistics. They can also be used for trouble shooting if customer complaints regarding speech quality are received by the operator.

Yet another application is a multi-party conference bridge, see [3]. In a multi-party bridge for a telecommunication system the incoming microphone signals from the different parties are digitally mixed and transmitted to the loudspeaker of the different parties. As an example, in a basic embodiment the incoming signals from all parties may be mixed and transmitted to all parties. For certain reasons, e.g. to reduce the background noise level of the transmitted signal, some implementations of multi-party bridges only mix the incoming signals from a fixed subset of the parties. This choice is typically performed on the basis of signal level and speaker activity of the different parties, where the most recent active talkers are retained if no speaker activity is present from any other party. A further modification to the basic operation is that the microphone signal coming from a party A may be excluded from the sum of the signal transmitted back to party A. Reasons for this are that the microphone signal from party A already is present in the loudspeaker of talker A (due to the side-tone in the telephone set), and that if a significant transmission delay is present in the system, the microphone signal will be perceived as an undesirable echo.

With the increased use of various mobile terminals (e.g. cellular phones), situations where two or more users in a conference call may be located in the same location will become more common. In these situations the speech from user A will also be present as input to the microphone of user B. With a significant transmission delay, this signal coming from the microphone of user B will introduce an undesirable talker echo to user A. Furthermore, the microphone signal from user A will be transmitted to the loudspeaker of user B. Due to the direct path of the voice between talker A and user B this may, with a significant transmission delay in the system, cause user B to experiences a listener echo of talker A. Similarly, if both the microphone signals from users A and B are transmitted to the other parties, this signal may contain an undesirable listener echo of talker A. Hence, there is a need for detecting cross-talk between two incoming lines to a multi-party conference bridge and control the transmission to the respective users based on this detected cross-talk.

In this specification the component of the received signal originating from the known signal will be referred to as echo.

There are several ways of detecting echo signals. For example one can use a set of short adaptive filters spanning the delay range of interest and an associated histogram to determine whether an echo signal is present and estimate its delay. This solution is described in [1]. A problem with this solution is its high computational cost.

Another known method is to correlate uplink and downlink signal power for several delays of interest. The echo can be detected based on observations of power correlation between uplink and downlink over a period of time. The echo is detected if the is power correlation for a certain delay has been pre-sent over a sufficiently long period of time. If the echo is detected for several delays, the delay where the power correlation is largest is selected as the delay estimate, see [5]. A problem with this solution is its slow convergence (the power correlation must be present over a sufficiently long time to detect echo and estimate its delay reliably).

A common drawback for both of the described methods is that they cannot be applied to coded speech directly without decoding the speech signals first. The ability to work directly on the coded bit-stream is becoming increasingly important as Transcoder Free Operation (TrFO) and Tandem Free Operation (TFO) are being introduced in the networks.

SUMMARY

An object of the present invention is simplified echo detection, and especially echo detection suitable for application to coded bit-streams.

Another object is a measure suitable for representing the similarity between two signals.

These objects are achieved in accordance with the attached claims.

The present invention is based on pitch comparison. Briefly, the present invention forms a set of distance measures between pitch estimates of a first signal and pitch estimates of a second signal at predetermined delays with respect to the first signal. From this set a distance measure corresponding to the highest similarity between the first and second signals is selected. If the selected distance measure has a certain relation to a similarity threshold, the second signal is classified as including an echo from the first signal. If an echo has been found, the delay corresponding to the selected distance measure may be used as an echo delay estimate.

BRIEF DESCRIPTION OF THE DRAWINGS

The invention, together with further objects and advantages thereof, may best be understood by making reference to the following description taken together with the accompanying drawings, in which.

DETAILED DESCRIPTION

In the following description elements performing the same or similar functions are provided with the same reference designations.

In order to detect echo, which is a reflection of the signal, one needs a similarity measure between the downlink and uplink signals. The echo path for the echo generated by mobile handsets is nonlinear and non-stationary, which makes it difficult to use traditional similarity measures applied directly to the waveform of the signals.

In the following description the GSM AMR (Adaptive Multi-Rate) speech codec will be used as an example, but similar reasoning is possible with many other speech codecs, in particular those based on CELP (Code Excited Linear Prediction) technology. The AMR codec works on 20 ms (160 samples) frames that are divided into four 5 ms (40 samples) sub-frames. The parameters available in an AMR coded bit-stream are the LSP (Line Spectral Pair) vectors, the fractional pitch lags (pitch period), the innovative code vectors, and the pitch and innovative gains [6]. According to the present invention the pitch period is the parameter of choice for echo detection. The pitch period or fundamental frequency of the speech signal is believed to have a better chance to pass an unknown nonlinear system unaltered or with a little modification than the other parameters used to represent the speech in an AMR codec. An intuitive reason for this conclusion is that a nonlinear system would likely generate harmonics but it would not alter the fundamental frequency of a sine wave passing it. Furthermore, in radio communication systems the pitch period is often protected by channel coding.

Figure 1:
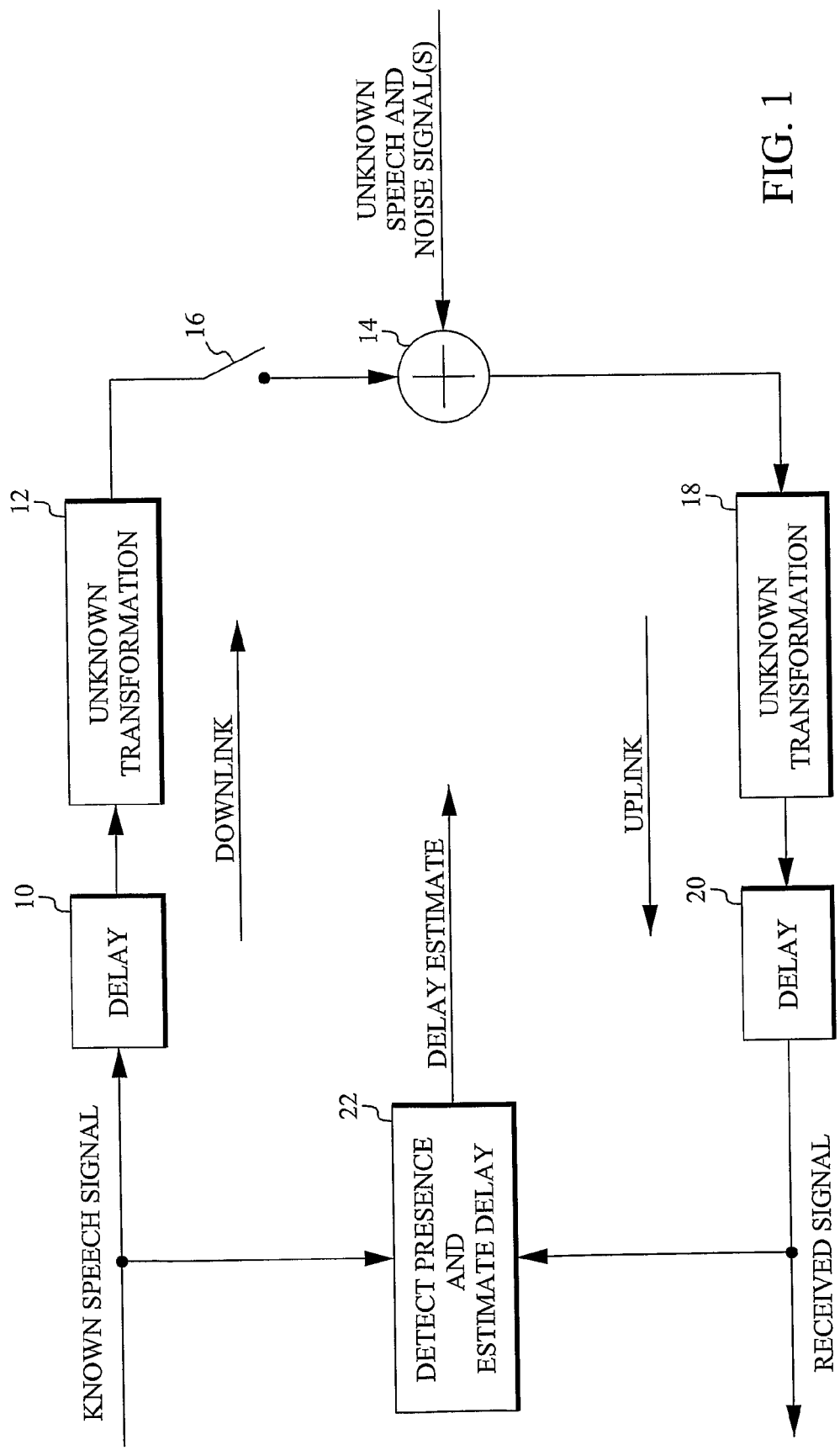
FIG. 1 is a block diagram illustrating echo generation and detection in general.

Denote the uplink (see FIG. 1) pitch period for sub-frame t by $T_{ul}(t)$ and the downlink pitch period for sub-frame $t-\Delta$ by $T_{dl}(t-\Delta)$. The uplink pitch period will be treated as a random variable due to the contribution of measurement errors and contributions from the true signal from the mobile side.

Denote the difference between uplink and downlink pitch periods by the process:

$$w(t,\Delta)=T_{ul}(t)-T_{dl}(t-\Delta) \qquad (1)$$

With these definitions it is now possible to use hypothesis testing. Thus, set up the following hypotheses:

$H_1$: the uplink signal contains echo as indicated by the similarity of uplink and downlink pitch periods.

$H_0$: an echo is not present, and the uplink pitch period is formed based only on the signals present at the mobile side.

Under hypothesis $H_1$, the process $w(t,\Delta)$ models pitch estimation errors in the speech codec residing in the mobile phone as well as the contribution from the true mobile signal. Simulations have indicated that the distribution of the estimation errors can be approximated by a Laplace distribution and that the contribution from the near end signal gives a uniform floor to the distribution function. It is thus assumed that under the hypothesis $H_1$ the distribution function of $w(t,\Delta)$ is given by:

$$p(w(t,\Delta)|H_1) = \begin{cases} \alpha \max\left(\frac{1}{2\delta}\exp\left(-\frac{|w(t,\Delta)|}{\delta}\right), \frac{\beta}{b-a}\right), & a<w(t,\Delta)<b \\ 0, & \text{otherwise} \end{cases} \qquad (2)$$

where:

β is a design parameter (typically lying between 0.1 and 0.3) that can be used to weight the Laplace and uniform components.

δ is the parameter (typically lying between 1 and 3) of the Laplace distribution.

a,b are variables determined by the limits in which pitch periods can be represented in the speech codec. In the 12.2 kbit/s mode of the AMR codec the pitch period ranges from 18 to 143 and in the other modes from 20 to 143. This gives a=−125, b=125 in the 2.2 kbit/s mode and a=−123, b=123 in all the other modes.

α is a constant normalizing the probability density function so that it integrates to unity. This constant is obtained by solving:

$$\int_a^b p(w)dw = 1 \quad (3)$$

which gives:

$$\alpha = \frac{b-a}{2\delta\beta\left(\ln\frac{2\delta\beta}{b-a} - 1\right) + (1+\beta)(b-a)} \quad (4)$$

Equation (2) can be rewritten in a more convenient form for further derivation:

$$p(w(t,\Delta) \mid H_1) = \quad (2)$$

$$\begin{cases} \frac{\alpha}{2\delta}\exp\left(-\frac{\min\left(|w(t,\Delta)|, -\delta\ln\frac{2\delta\beta}{b-a}\right)}{\delta}\right), & a < w(t,\Delta) < b \\ 0, & \text{otherwise} \end{cases}$$

Under the hypothesis $H_0$, the distribution of $w(t,\Delta)$ is assumed to be uniform within the interval [a,b], i.e.:

$$p(w(t,\Delta) \mid H_0) = \begin{cases} \frac{1}{b-a}, & a < w(t,\Delta) < b \\ 0, & \text{otherwise} \end{cases} \quad (6)$$

It is assumed that the values taken by the random processes $w(t,\Delta)$ at various time instances are statistically independent. Then the joint probability density of N such densities (corresponding to N sub-frames; typically N lies around 100 or more) is the product of the individual densities:

$$\begin{cases} p(w(\Delta) \mid H_1) = \prod_{m=1}^{N} p(w(m,\Delta) \mid H_1) \\ p(w(\Delta) \mid H_0) = \prod_{m=1}^{N} p(w(m,\Delta) \mid H_0) \end{cases} \quad (7)$$

A likelihood ratio test, see [7], can now be designed for the hypotheses $H_0$ and $H_1$ mentioned above. It is assumed that both hypotheses have equal a priori probabilities. Then the test is given by:

$$\Lambda(T_{ul}) = \frac{\prod_{m=1}^{N} \frac{\alpha}{2\delta}\exp\left(-\frac{\min\left(|w(m,\Delta)|, -\delta\ln\frac{2\delta\beta}{b-a}\right)}{\delta}\right)}{\prod_{m=1}^{N}\frac{1}{b-a}} \underset{H_0}{\overset{H_1}{\gtrless}} 1 \quad (8)$$

Taking the logarithm and simplifying (8) gives the following test:

$$-\frac{1}{N}\sum_{m=1}^{N} \min\left(|w(m,\Delta)|, -\delta\ln\frac{2\delta\beta}{b-a}\right) \underset{H_0}{\overset{H_1}{\gtrless}} \delta\left(\ln\frac{2\delta}{\alpha} - \ln(b-a)\right) \quad (9)$$

It is noted that the right-hand side of (9) only includes known constants. Thus it can be represented by a threshold:

$$TH = \delta\left(\ln\frac{2\delta}{\alpha} - \ln(b-a)\right) \quad (10)$$

Similarly the second argument of the minimum function in (9) can be represented by a limiting constant:

$$LIM = -\delta\ln\frac{2\delta\beta}{b-a} \quad (11)$$

Thus, (9) may be written (using the definition of $w(t,\Delta)$) as:

$$D(\Delta) = -\frac{1}{N}\sum_{m=1}^{N} \min(|T_{ul}(m) - T_{dl}(m-\Delta)|, LIM) \underset{H_0}{\overset{H_1}{\gtrless}} TH \quad (12)$$

The distance $D(\Delta)$ represents a measure of the presence/absence of an echo having a delay $\Delta$. The more $D(\Delta)$ exceeds the threshold TH, the more certain becomes the presence of an echo with delay $\Delta$ (hypothesis $H_1$). However, it should be noted that $D(\Delta)$ only represents a measure of the presence/absence of an echo at a specific instance in time. A general expression corresponding to (12) for an arbitrary instance t in time is:

$$D(t,\Delta) = -\frac{1}{N}\sum_{m=0}^{N-1} \min(|T_{ul}(t-m) - T_{dl}(t-m-\Delta)|, LIM) \underset{H_0}{\overset{H_1}{\gtrless}} TH \quad (13)$$

Figure 2:
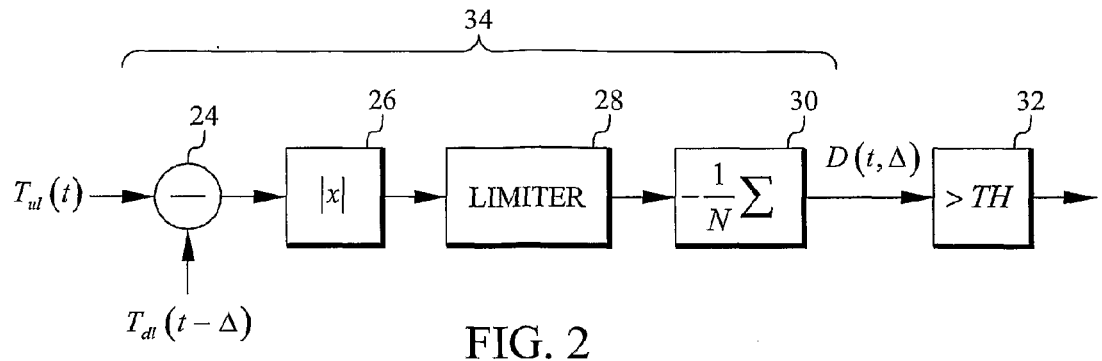
FIG. 2 is a block diagram of an embodiment of a similarity detection apparatus in accordance with the present invention.

Equation (13) can now be used as the basis for an echo delay detector that detects the presence/absence of an echo with delay $\Delta$. The detector needs to compute the absolute distance between the uplink and downlink pitch periods for the delay $\Delta$, limit (saturate) the absolute distances to be less than LIM, sum up the results for all N time instances and compare the sum to threshold TH. The structure of such a detector is shown in FIG. 2. The detector includes a subtractor 24 receiving the uplink pitch $T_{ul}(t)$ and the delayed downlink pitch $T_{dl}(t-\Delta)$. The distance or difference signals $w(t,\Delta)$ are forwarded to an absolute value unit 26 connected to a limiter 28 and a summation unit 30, in which the last N results are accumulated and divided by N. The sum is then forwarded to a classifier or comparator 32, in which it is compared to threshold TH. If the threshold is exceeded, hypothesis $H_1$ is considered valid, i.e. an echo has been detected for the delay $\Delta$, otherwise hypothesis $H_0$ is considered valid, i.e. no echo is present.

Figure 3:
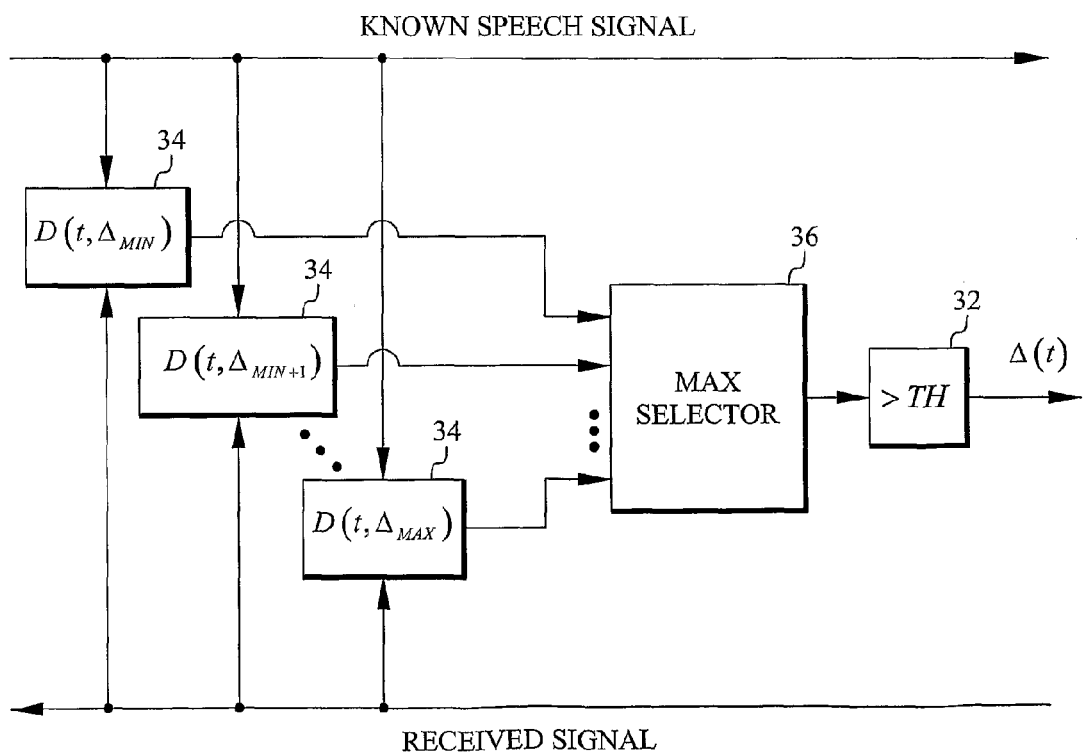
FIG. 3 is a block diagram of an embodiment of an echo detector in accordance with the present invention.

FIG. 2 shows the detection for a single delay channel having a delay $\Delta$. In order to be able to detect echo with an unknown delay and estimate the delay, one needs to implement several delay channels operating in parallel as shown in FIG. 3. The echo delay corresponds to the delay Δ with largest associated distance measure D(t,Δ). In FIG. 3 a set of signal similarity detectors 34, which may have the structure illustrated in FIG. 2, determine the distance measures $D(t,\Delta_{MIN})$, $D(t,\Delta_{MIN+1})$, ..., $D(t,\Delta_{MAX})$ for a set of delays $\Delta_{MIN}$, $\Delta_{MIN+1}$, ..., $\Delta_{MAX}$. The delays depend on the application (where the echo is expected to lie). For mobile echo detection in a GSM system $\Delta_{MIN}$ lies in the interval 100-160 ms and $\Delta_{MAX}$ lies in the interval 300-360 ms. A selector 36 selects the delay Δ(t) corresponding to the largest distance measure D(t, Δ) and classifier 32 outputs the corresponding delay Δ(t) if the selected distance measure exceeds threshold TH. If it does not exceed the threshold, which indicates that there is no echo present, a "dummy" value, for example 0, is generated.

In an alternative embodiment the echo detector can be implemented as a running sum i.e. at time t we compute the following distance measure for each of the delays of interest and compare it to zero:

$$D(t, \Delta) = \qquad (14)$$
$$\lambda D(t-1, \Delta) - (1-\lambda)(TH + \min(|T_{ul}(t) - T_{dl}(t-\Delta)|, LIM)) \underset{H_0}{\overset{H_1}{\gtrless}} 0$$

where TH and LIM correspond to the constants in (13) and λ is a weighting factor used to "forget" older contributions to D(t,Δ). For example, suitable values for the constants are TH=7 (TH typically lies in the interval [4.7,10.9]) and LIM=9 (LIM typically lies in the interval [7.1,18.0]). The weighting factor λ typically lies in the interval [0.9,0.99]. Note that since the absolute pitch period distance is introduced with a minus sign into (14), a large distance measure implies that there is similarity between the uplink and downlink signals, and vice versa, a small distance measure indicates that no similarity has been found. The echo is detected if any of the distance measures exceeds zero level. The echo delay corresponds to the Δ having the largest associated distance measure D(t,Δ) that exceeds zero.

Figure 4:
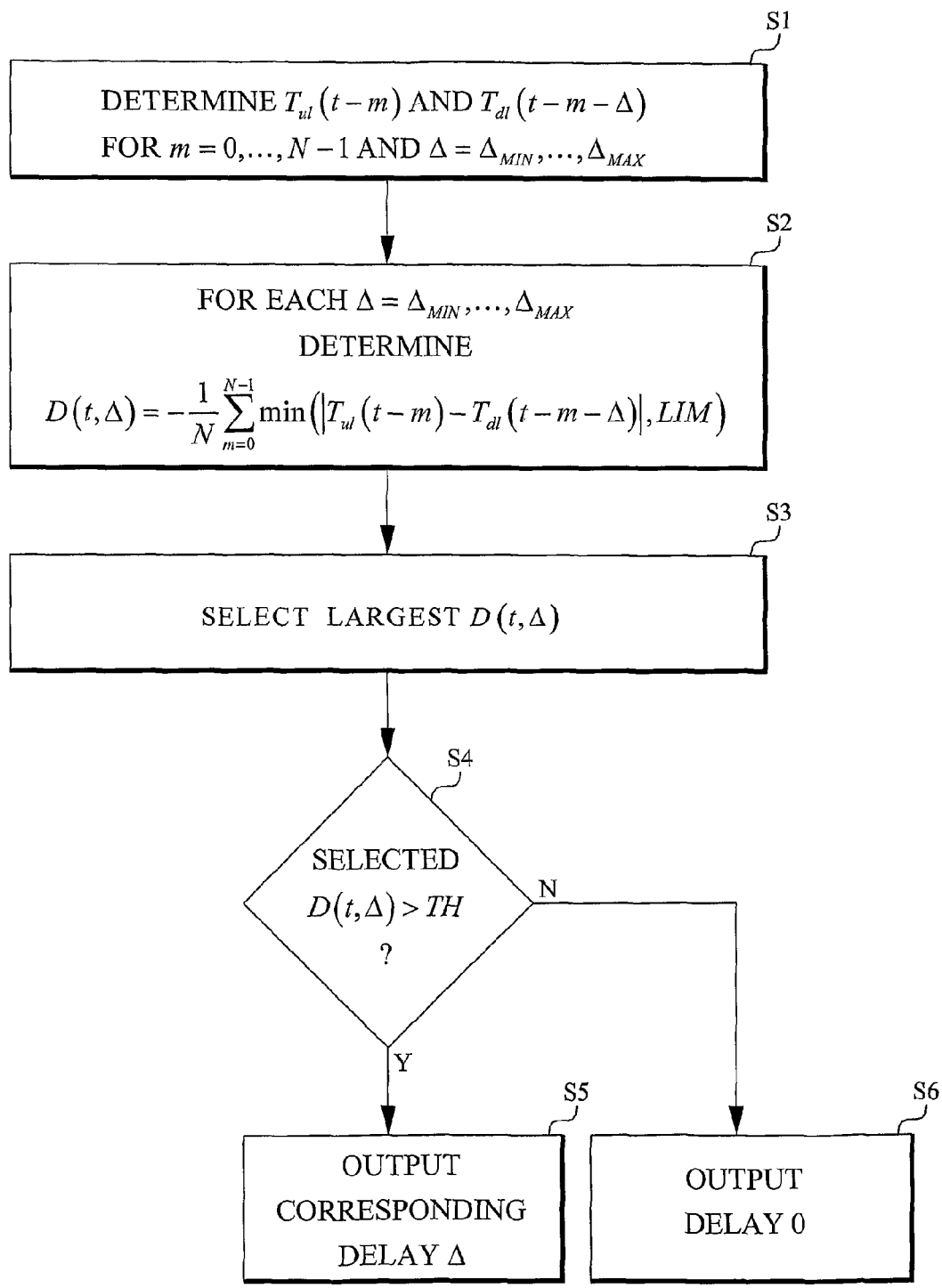
FIG. 4 is a flow chart illustration an embodiment of the echo detection method in accordance with the present invention.

FIG. 4 is a flow chart illustrating an embodiment of the echo delay detection method in accordance with the present invention. At a particular time instant t step S1 determines $T_{ul}(t-m)$ and $T_{dl}(t-m-\Delta)$ for the possible values of m and m−ΔΔ. Typically older values are stored in buffer memories. Step S2 determines the distance measure D (t,Δ) for each delay Δ in accordance with (13). Step S3 selects the largest D(t,Δ). Step S4 tests whether the selected distance measure exceeds the threshold TH. If it does, step S5 outputs the delay Δ corresponding to the selected distance measure D(t,Δ). Otherwise Step S6 outputs a value representing "no echo", for example the value 0.

It should be noted that the particular way of computing the distance measure D(t,Δ) between uplink and downlink pitch periods is not critical for the current invention. Another embodiment of the invention is to model the distribution of the estimation errors w(t,Δ) as Gaussian instead of Laplacian. In this case a similar derivation as presented above will lead to a quadratic distance measure as opposed to the truncated absolute distance measure above.

According to this embodiment the distance between the pitch periods of the up- and downlink signals is computed for different signal delays Δ using a rectangular window of N sub frames (N=16, for example) as:

$$D_G(t, \Delta) = \frac{1}{N} \sum_{m=0}^{N-1} (T_{ul}(t-m) - T_{dl}(t-m-\Delta))^2 \underset{H_1}{\overset{H_0}{\gtrless}} TH_G \qquad (15)$$

Figure 5:
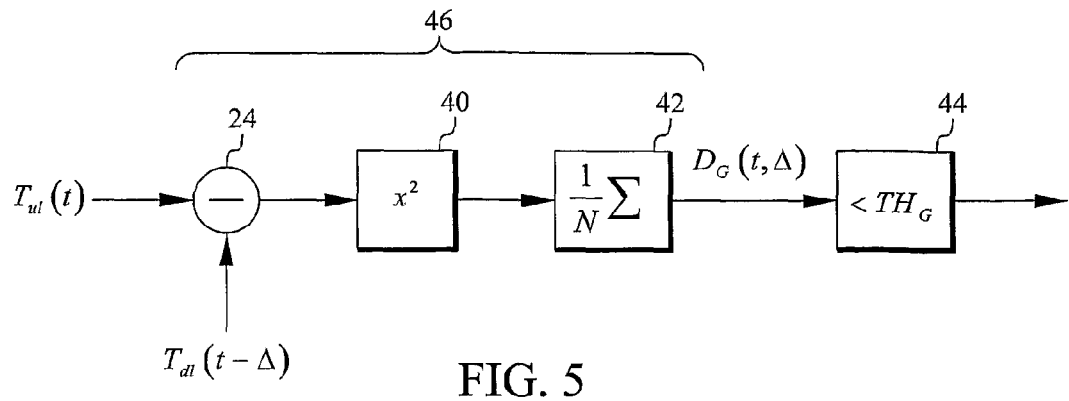
FIG. 5 is a block diagram of another embodiment of a similarity detection apparatus in accordance with the present invention.
Figure 6:
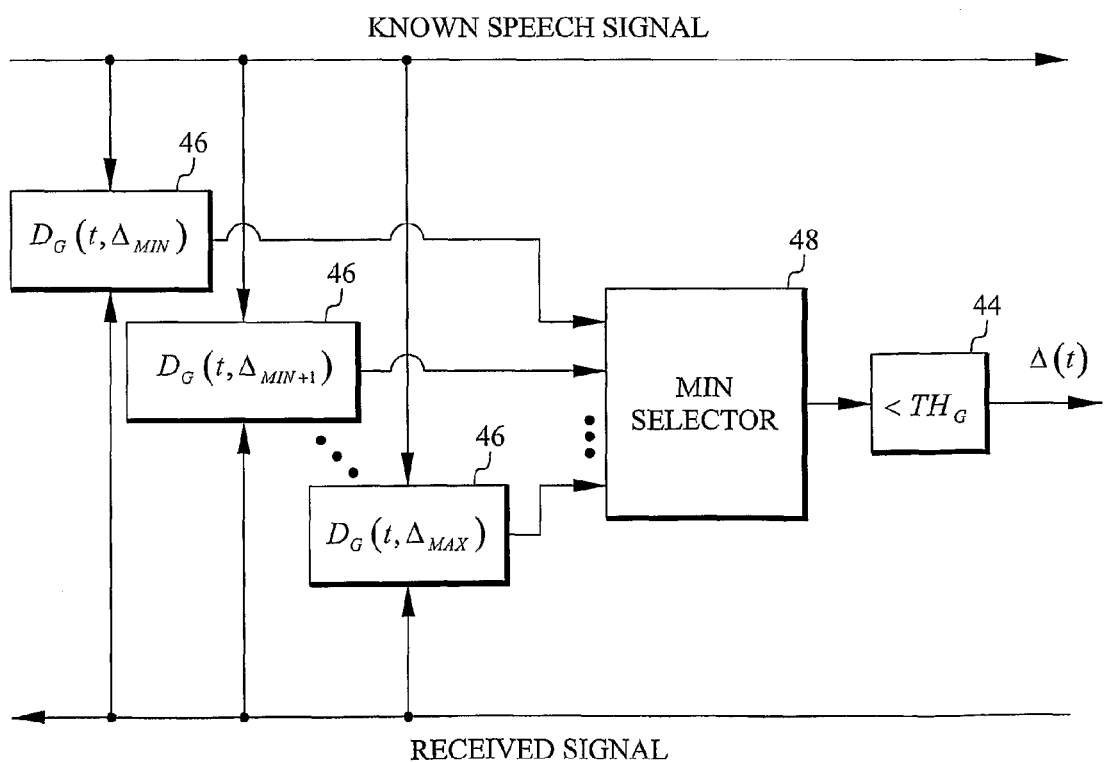
FIG. 6 is a block diagram of another embodiment of an echo detector in accordance with the present invention.

If the minimum value of $\{D_G(t,\Delta)\}_{\Delta_{MIN}}^{\Delta_{MAX}}$ is less than a pre-defined threshold $TH_G$ (e.g. 10), the presence of echo is detected and the signal delay can be found from the delay corresponding to the minimum value of $D_G(t,\Delta)$. FIGS. 5 and 6 illustrate this embodiment. In FIG. 5 a squaring unit 40 squares the difference between the uplink pitch $T_{ul}(t)$ and the delayed downlink pitch $T_{dl}(t-\Delta)$. These squares are accumulated in a summation unit 42, and the resulting sum $D_G(t,\Delta)$ is forwarded to a classifier or comparator 44, which compares it to threshold $TH_G$ ($TH_G$ typically lies in the interval [8,12]). If the threshold is exceeded no echo is present, otherwise an echo has been detected.

In the embodiment illustrated in FIG. 6, a set of signal similarity detectors 46, which may have the structure illustrated in FIG. 5, determine the distance measures $D_G(t,\Delta_{MIN})$, $D_G(t,\Delta_{MIN+1})$, ..., $D_G(t,\Delta_{MAX})$ for a set of predetermined delays $\Delta_{MIN}$, $\Delta_{MIN+1}$, ..., $\Delta_{MAX}$. A selector 48 selects the smallest distance measure $D_G(t,\Delta)$, and classifier 44 outputs the corresponding delay Δ(t) if the selected distance measure does not exceed threshold $TH_G$. If it does exceed the threshold, which indicates that there is no echo present, a "dummy" value, for example 0, is generated.

In an alternative embodiment corresponding to equation (14), the Gaussian embodiment may be implemented as:

$$D_G(t, \Delta) = \lambda D_G(t-1, \Delta) + (1-\lambda)((T_{ul}(t) - T_{dl}(t-\Delta))^2 - TH_G) \underset{H_1}{\overset{H_0}{\gtrless}} 0 \qquad (16)$$

Another embodiment of the invention is to model the distribution of the estimation errors w(t,Δ) as a Levy alpha-stable distribution, see [8]. The important features of a suitable distribution are that it should be symmetric with respect to zero and that it should have a rather narrow maximum.

Figure 7:
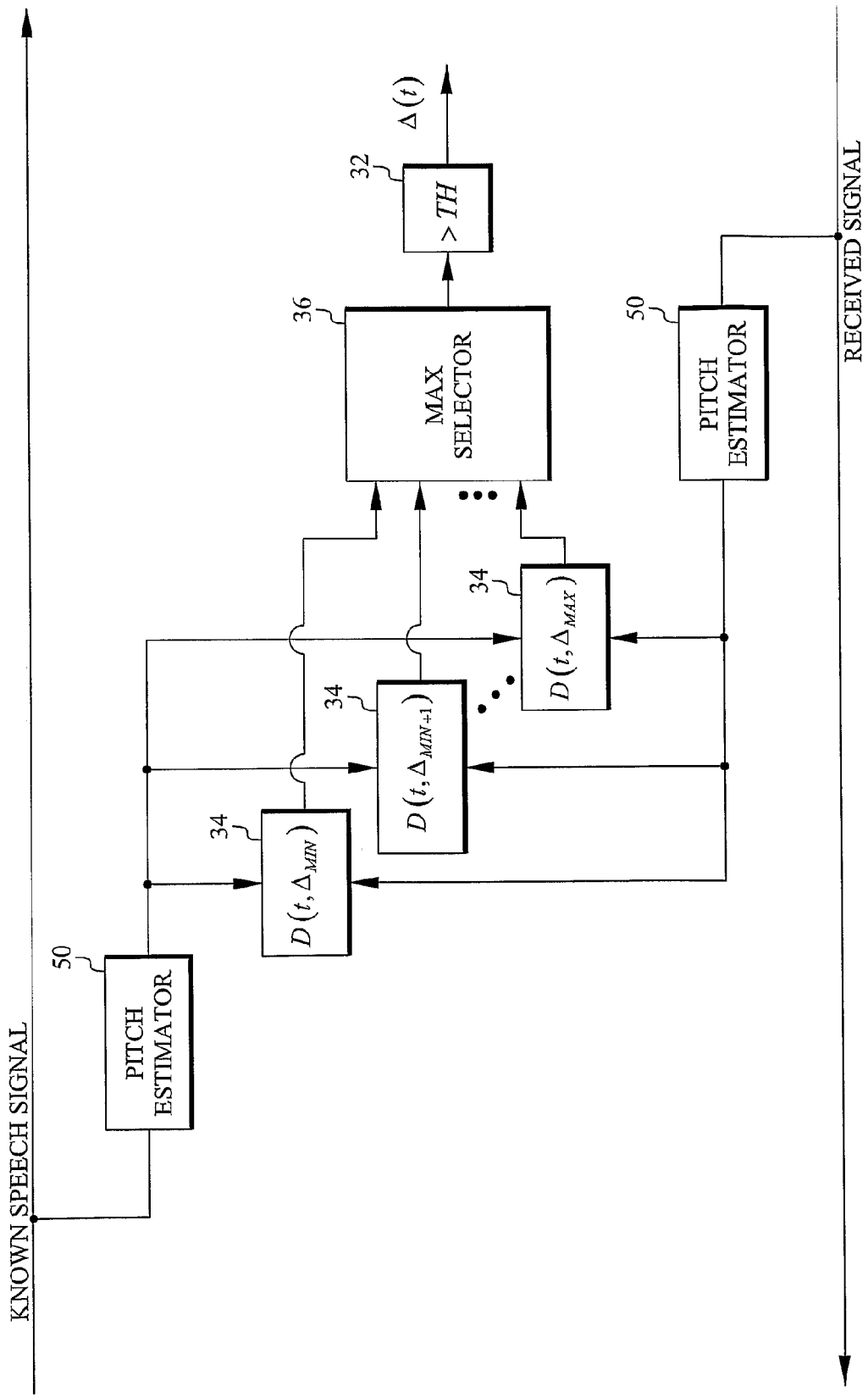
FIG. 7 is a block diagram of still another embodiment of an echo detector in accordance with the present invention.

Even though the invention is especially useful if the speech signals are coded (TrFO or TFO is used for transmission), it can also handle the case of non-coded signals, e.g. in ITU-T G.711 A-law or μ-law format. In this case one needs to add pitch estimators of the known speech signal and the received signal to the detector. A suitable pitch estimator is described e.g. in [6]. This configuration is shown in FIG. 7. In this embodiment pitch estimators 50 have been inserted between the known and received signals and the echo detector of FIG. 3.

In the embodiments described above one distance measure was selected and then compared to a threshold. However, another possibility is to compare each distance measure to the threshold first and then select one measure (max or min, depending on the embodiment) from the set of measures that have passed the threshold comparison.

There are several practicalities that can be added to the basic detector structures derived above:
  Speech signals are non-stationary, and there is no point in running the echo detector if the downlink speech is missing or is too silent to generate any echo. In a practical embodiment the distance measure may be updated only if the downlink signal power is above −40 dBm0, for example.

Similarly, there may be a threshold on the downlink pitch gain. For the AMR codec the threshold can be set to 10000, for example.

The detection may be performed only on "good" uplink frames i.e. SID (Silence Insertion Descriptor) frames and corrupted frames may be excluded.

To allow fast detection of a spurious echo burst, the distance measures may be saturated at, for example, −200, i.e. we always have $D(t,\Delta) \geq -200$.

It is a well known fact that the most common error in pitch estimation results in twice the actual pitch period. This feature can be exploited to enhance the echo detector. In the particular implementation of equation (14) this may be taken into account by adding a detector to the original detector, where the downlink pitch period is compared to half of the uplink pitch period. For example equation (14) may be modified into:

$$D(t, \Delta) = \lambda 2 \cdot D(t-1, \Delta) - (1 - \lambda 2)\left(TH2 + \min\left(\left|T_{ul}(t) - \frac{T_{dl}(t-\Delta)}{2}\right|, LIM2\right)\right) \underset{H_0}{\overset{H_1}{\gtrless}} 0 \quad (17)$$

where λ2, TH2, LIM2 correspond to λ, TH, LIM in equation (14), but may have different values. Since we are now looking at a channel related to the most probable pitch estimation errors made by the encoder in the mobile phone, it is reasonable to select the constants TH2, LIM2 smaller than TH, LIM in (14). For example, suitable values for the constants are TH2=4 (TH2 typically lies in the interval [3,5]) and LIM2=6 (LIM2 typically lies in the interval [5,7]). Typically λ2=λ to give the same "length of memory", but this is not strictly necessary. In an illustrative embodiment only one of the updates given by (14) and (17) is used at each time instant t. This is demonstrated by the following pseudo-code:

if $|T_{ul}(t) - T_{dl}(t - \Delta)| < \left|T_{ul}(t) - \frac{T_{dl}(t-\Delta)}{2}\right|$ then update to $D(t, \Delta)$ using (14)

else update to $D(t, \Delta)$ using (17)

Other likely pitch estimation errors, such as half of the actual pitch, can be handled similarly.

The functionality of the various blocks of the signal similarity and echo detector is typically achieved by one or several micro processors or micro/signal processor combinations and corresponding software.

Although the present invention has been described with reference to echo detection, which implies a certain delay between the involved signals, it is appreciated that the same principles may in fact be used to detect similarity between two general signals (with or without mutual delays).

Furthermore, although the present invention has been described with reference to speech signals, it is appreciated that the same principles are applicable to more general audio signals having harmonic content, such as music. In fact the same principles are applicable to any kind of signal that can be partially characterized by a pitch estimate.

The described invention has several advantages:

It allows rapid detection and delay estimation of a delayed and possibly distorted replica of a known speech or audio signal in a mixture of several speech and/or audio signals and noise. For example it allows rapid detection and delay estimation of mobile echo.

It is capable of coping with nonlinear echo paths.

It is capable of working on coded speech (only extraction of pitch period is required).

It will be understood by those skilled in the art that various modifications and changes may be made to the present invention without departure from the scope thereof, which is defined by the appended claims.

REFERENCES

[1] ITU-T Recommendation G.131, Control of talker echo
[2] A. Eriksson et al., Mobile Crosstalk Control—Enhancing speech quality in mobile systems, Ericsson Review 1998, No. 2.
[3] U.S. Pat. No. 6,771,779, Reducing acoustic crosstalk in multi-microphone conference system by inverting estimated crosstalk matrix for filtering
[4] U.S. Pat. No. 6,256,384, Method and apparatus for cancelling echo originating from a mobile terminal.
[5] U.S. Pat. No. 6,466,666, Echo power estimation method for telephony system
[6] 3GPP TS 26.090 V6.0.0 (2004-12) 3rd Generation Partnership Project; Technical Specification Group Services and System Aspects; Mandatory Speech Codec speech processing functions; Adaptive Multi-Rate (AMR) speech codec; Transcoding functions (Release 6)
[7] L. Van Trees, Detection, Estimation, and Modulation Theory, Wiley & Sons, 1971, pp. 19-33.
[8] Wikipedia, http://answers.com/topic/1-vy-distribution.

The invention claimed is:

1. An echo detection method, including the steps of
    forming a set of distance measures between pitch estimates of a first signal and pitch estimates of a second signal at predetermined delays with respect to said first signal by hypothesis testing, where the differences between pitch estimates of said first signal and pitch estimates of said second signal are assumed to be random processes following a first predetermined statistical distribution when an echo is present and a second predetermined statistical distribution when no echo is present;
    selecting a distance measure from said set corresponding to the highest similarity between said first and second signals;
    classifying said second signal as including an echo from said first signal if the selected distance measure has a predetermined relation to a predetermined similarity threshold.

2. The method of claim 1, including the step of indicating the delay corresponding to a selected distance measure if said second signal has been classified as including an echo.

3. The method of claim 1, wherein said first predetermined statistical distribution is the Laplace distribution in combination with a uniform floor.

4. The method of claim 1, wherein said first predetermined statistical distribution is the Gauss distribution.

5. The method of claim 1, wherein said first predetermined statistical distribution is the Levy alpha-stable distribution.

6. The method of claim 1, wherein said second predetermined statistical distribution is the uniform distribution.

7. The method of claim 1, wherein a distance measure associated with an instant t and a delay Δ is proportional to:

$$D(t, \Delta) = -\sum_{m=0}^{N-1} \min(|T_{ul}(t-m) - T_{dl}(t-m-\Delta)|, \text{LIM})$$

where $T_{ul}$ is a pitch estimate of said first signal,
$T_{dl}$ is a pitch estimate of said second signal,
LIM is a floor,
N is the number of respective pitch estimates included in the distance measure.

8. The method of claim 1, wherein a distance measure $D(t,\Delta)$ associated with an instant t and a delay $\Delta$ is proportional to:

$D(t,\Delta) = \lambda D(t-1,\Delta) - (1-\lambda)(TH + \min(|T_{ul}(t) - T_{dl}(t-\Delta)|, \text{LIM}))$ where $T_{ul}$ is a pitch estimate of said first signal,
$T_{dl}$ is a pitch estimate of said second signal,
LIM is said floor,
TH is a predetermined constant,
$\lambda$ is a predetermined weighting factor.

9. The method of claim 1, wherein a distance measure $D_G(t,\Delta)$ associated with an instant t and a delay $\Delta$ is proportional to:

$$D_G(t, \Delta) = \sum_{m=0}^{N-1} (T_{ul}(t-m) - T_{dl}(t-m-\Delta))^2$$

where $T_{ul}$ is a pitch estimate of said first signal,
$T_{dl}$ is a pitch estimate of said second signal,
N is the number of respective pitch estimates included in the distance measure.

10. The method of claim 1, wherein a distance measure $D_G(t,\Delta)$ associated with an instant t and a delay $\Delta$ is proportional to:

$D_G(t,\Delta) = \lambda D_G(T-1,\Delta) + (1-\lambda)((T_{ul}(t) - T_{dl}(t-\Delta))^2 - TH_G)$ where $T_{ul}$ is a pitch estimate of said first signal,
$T_{dl}$ is a pitch estimate of said second signal,
$TH_G$ is a predetermined constant,
$\lambda$ is a predetermined weighting factor.

11. The method of claim 1, including the step of obtaining said pitch estimates from coded bit-streams.

12. The method of claim 1, including the step of deriving said pitch estimates from non-coded data streams.

13. A method of determining the similarity between a first signal and a second signal, including the step of forming a distance measure between pitch estimates of said first signal and pitch estimates of said second signal by hypothesis testing, where the differences between pitch estimates of said first signal and pitch estimates of said second signal are assumed to be random processes following a first predetermined statistical distribution when said signals are similar and a second predetermined statistical distribution when they are not similar.

14. The method of claim 13, wherein said first predetermined statistical distribution is the Laplace distribution in combination with a uniform floor.

15. The method of claim 13, wherein said first predetermined statistical distribution is the Gauss distribution.

16. The method of claim 13, wherein said first predetermined statistical distribution is the Levy alpha-stable distribution.

17. The method of claim 13, wherein said second predetermined statistical distribution is the uniform distribution.

18. The method of claim 13, wherein a distance measure $D(t,\Delta)$ associated with an instant t and a delay $\Delta$ is proportional to:

$$D(t, \Delta) = -\sum_{m=0}^{N-1} \min(|T_{ul}(t-m) - T_{dl}(t-m-\Delta)|, \text{LIM})$$

where $T_{ul}$ is a pitch estimate of said first signal,
$T_{dl}$ is a pitch estimate of said second signal,
LIM is said floor,
N is the number of respective pitch estimates included in the distance measure.

19. The method of claim 13 wherein a distance measure $D(t,\Delta)$ associated with an instant t and a delay $\Delta$ is proportional to:

$D(t,\Delta) = \lambda D(t-1,\Delta) - (1-\lambda)(TH + \min(|T_{ul}(t) - T_{dl}(t-\Delta)|, \text{LIM}))$ where $T_{ul}$ is a pitch estimate of said first signal,
$T_{dl}$ is a pitch estimate of said second signal,
LIM is said floor,
TH is a predetermined constant,
$\lambda$ is a predetermined weighting factor.

20. The method of claim 13, wherein a distance measure $D(t,\Delta)$ associated with an instant t and a delay $\Delta$ is proportional to:

$$D_G(t, \Delta) = \sum_{m=0}^{N-1} (T_{ul}(t-m) - T_{dl}(t-m-\Delta))^2$$

where $T_{ul}$ is a pitch estimate of said first signal,
$T_{dl}$ is a pitch estimate of said second signal,
N is the number of respective pitch estimates included in the distance measure.

21. The method of claim 13, wherein a distance measure $D(t,\Delta)$ associated with an instant t and a delay $\Delta$ is proportional to:

$D_G(t,\Delta) = \lambda D_G(t-1,\Delta) + (1-\lambda)((T_{ul}(t) - T_{dl}(t-\Delta))^2 TH_G)$ where $T_{ul}$ is a pitch estimate of said first signal,
$T_{dl}$ is a pitch estimate of said second signal,
$TH_G$ is a predetermined constant,
$\lambda$ is a predetermined weighting factor.

22. The method of claim 13, including the step of obtaining said pitch estimates from coded bit-streams.

23. The method of claim 13, including the step of deriving said pitch estimates from non-coded data streams.

24. An echo detector, including means for forming a set of distance measures between pitch estimates of a first signal and pitch estimates of a second signal at predetermined delays with respect to said first signal, said means being arranged to use hypothesis testing, where the differences between pitch estimates of said first signal and pitch estimates of said second signal are assumed to be random processes following a first predetermined statistical distribution when an echo is present and a second predetermined statistical distribution when no echo is present;

- a selector for selecting a distance measure from said set corresponding to the highest similarity between said first and second signals;
- a classifier for classifying said second signal as including echo from said first signal if the selected distance measure has a predetermined relation to a predetermined similarity threshold (TH, $TH_G$).

25. The echo detector of claim 24, wherein said classifier is arranged to indicate the delay corresponding to said selected distance measure if said second signal has been classified as including an echo.

26. An apparatus for determining the similarity between a first signal and a second signal, including means for forming a distance measure between pitch estimates of said first signal and pitch estimates of said second signal, said means being arranged to use hypothesis testing, where the differences between pitch estimates of said first signal and pitch estimates of said second signal are assumed to be random processes following a first predetermined statistical distribution when said signals are similar and a second predetermined statistical distribution when they are not similar.

* * * * *

UNITED STATES PATENT AND TRADEMARK OFFICE
CERTIFICATE OF CORRECTION

PATENT NO. : 8,130,940 B2
APPLICATION NO. : 12/095856
DATED : March 6, 2012
INVENTOR(S) : Trump et al.

It is certified that error appears in the above-identified patent and that said Letters Patent is hereby corrected as shown below:

In Column 3, Line 8, delete "pre-sent" and insert -- present --, therefor.

In Column 5, Line 24, delete Equation Number "(2)" and insert Equation Number -- (5) --, therefor.

In Column 7, Line 48, delete "m-ΔA." and insert -- m-Δ. --, therefor.

In Column 11, Line 44, in Claim 10, delete " $D_G(t,\Delta)=\lambda D_G(T-1,\Delta)$ ," and insert -- $D_G(t, \Delta) = \lambda D_G(t - 1, \Delta)$ --, therefor.

Signed and Sealed this
Fourteenth Day of August, 2012

David J. Kappos
*Director of the United States Patent and Trademark Office*